US008334757B2

(12) United States Patent
Guajardo Merchan et al.

(10) Patent No.: US 8,334,757 B2
(45) Date of Patent: Dec. 18, 2012

(54) CONTROLLING DATA ACCESS TO AND FROM AN RFID DEVICE

(75) Inventors: Jorge Guajardo Merchan, Eindhoven (NL); Claudine Viegas Conrado, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 743 days.

(21) Appl. No.: 12/517,276

(22) PCT Filed: May 9, 2007

(86) PCT No.: PCT/IB2007/051747
§ 371 (c)(1),
(2), (4) Date: Jun. 2, 2009

(87) PCT Pub. No.: WO2008/068644
PCT Pub. Date: Jun. 12, 2008

(65) Prior Publication Data
US 2010/0073147 A1    Mar. 25, 2010

(30) Foreign Application Priority Data
Dec. 6, 2006   (EP) .................................... 06125477

(51) Int. Cl.
*H04L 9/32*        (2006.01)
*H04Q 5/22*        (2006.01)
(52) U.S. Cl. .................... 340/10.51; 340/5.54; 340/5.85; 340/10.1; 235/375; 235/382; 380/277; 380/44; 713/168; 713/183
(58) Field of Classification Search .................. 340/5.54, 340/5.85, 10.1, 10.51; 235/375, 382; 380/277, 380/44; 713/168, 183
See application file for complete search history.

(56) References Cited

U.S. PATENT DOCUMENTS 5,226,080 A * 7/1993 Cole et al. ...................... 713/183
5,544,246 A * 8/1996 Mandelbaum et al. ......... 705/65
(Continued)

FOREIGN PATENT DOCUMENTS
GB    2413195 A    10/2005
(Continued)

OTHER PUBLICATIONS

Joseph Pearson, Securing the Pharmaceutical Supply Chaing With RFID and Public-Key Infrastructure (PKI) Technologies, Texas Instruments Radio Frequency Identification Systems, Jun. 1, 2005, pp. 1-12.
Robin Koh et al, "Securing the Pharmaceutical Suply Chain", Auto ID Center Massachusetts Institute of Technology, Jun. 2003, pp. 1-17.
(Continued)

*Primary Examiner* — Jennifer Mehmood
*Assistant Examiner* — Andrew Bee

(57) ABSTRACT

A method for controlling data access to and from an RFID device wherein the RFID reading device authenticates himself to the RFID device before the RFID device communicates with the RFID reading device. The RFID device is equipped with a physically uncloneable function, which is adapted to produce a unique but unpredictable response signal upon receiving a predefined challenging signal. During an enrolement of the RFID device, a first response signal is uniquely associated with a first challenging signal and is stored in a memory of the RFID device. The first challenging signal represents a password for opening further data communication with the RFID device. When a RFID reading device queries the RFID device with a second challenging signal, the RFID device compares a corresponding second response signal with the first response signal stored during enrollment and only if there is a match, responds with its identifier.

14 Claims, 4 Drawing Sheets

U.S. PATENT DOCUMENTS

| | | | |
|---|---|---|---|
| 6,038,320 A * | 3/2000 | Miller | 380/44 |
| 6,064,736 A * | 5/2000 | Davis et al. | 713/155 |
| 6,725,382 B1 * | 4/2004 | Thompson et al. | 726/19 |
| 6,842,106 B2 | 1/2005 | Hughes et al. | |
| 7,599,847 B2 * | 10/2009 | Block et al. | 705/5 |
| 7,681,103 B2 * | 3/2010 | Devadas et al. | 714/752 |
| 7,702,927 B2 * | 4/2010 | Devadas et al. | 713/194 |
| 7,818,569 B2 * | 10/2010 | Clarke et al. | 713/168 |
| 7,840,803 B2 * | 11/2010 | Clarke et al. | 713/168 |
| 2006/0200672 A1 * | 9/2006 | Calhoon et al. | 713/176 |
| 2006/0210082 A1 | 9/2006 | Devadas et al. | |
| 2006/0230283 A1 * | 10/2006 | McBride et al. | 713/184 |
| 2007/0069852 A1 * | 3/2007 | Mo et al. | 340/5.1 |
| 2008/0061941 A1 * | 3/2008 | Fischer et al. | 340/10.1 |
| 2008/0169909 A1 * | 7/2008 | Park et al. | 340/10.4 |
| 2008/0256600 A1 * | 10/2008 | Schrijen et al. | 726/2 |
| 2009/0183248 A1 * | 7/2009 | Tuyls et al. | 726/9 |

FOREIGN PATENT DOCUMENTS

| | | |
|---|---|---|
| WO | 2006038183 A1 | 4/2006 |

OTHER PUBLICATIONS

Pim Tuyls et al, "RFID-Tags for Anti-Counterfeiting", Topics in Cryptology, the Cryptographers' Track At the RSA Conference, Feb. 2006, pp. 1-17.

Jean-Paul Linnartz et al, "New Shielding Functions to Enhance Privacy and Prevent Misuse of Biometric Templates", AVBPA 2003, pp. 1-9.

Yevgeniy Dodis et al, "Fuzzy Extractors: How to Generate Strong Keys From Biometrics and Other Noisy Data", Advances in Cryptology, Eurocrypt May 2004, pp. 523-540.

Stephen A. Weis et al, "Security and Privacy Aspects of Low-Cost Radio Frequency Identification Systems" Intelligent Sensors, Proceedings of the 2004 Melbourne, Australia, IEEE, Dec. 14, 2004, pp. 337-342.

Ari Juels et al, "A Fuzzy Commitment Scheme", Sixth ACM Conference on Computer and Communication Security, ACM Press 1999, pp. 28-36.

* cited by examiner

CONTROLLING DATA ACCESS TO AND FROM AN RFID DEVICE

FIELD OF INVENTION

The present invention relates to the field of Radio Frequency Identification (RFID) devices. Specifically the present invention relates to a method for controlling the data access to and from an RFID device in particular in order to check the integrity of the RFID device and/or to check the integrity of a product being equipped with the RFID device.

Further, the present invention relates to an RFID device comprising a physical uncloneable function, which RFID device is adapted to be used for carrying out the above-described method for controlling the data access to and from an RFID device.

Furthermore, the present invention relates to an RFID reading device and an RFID system both being adapted to be used for carrying out the above-described method for controlling the data access to and from an RFID device.

ART BACKGROUND

Radio Frequency Identification (RFID) is an emerging technology with numerous applications, e.g. as smart labels or tags. RFID devices respectively RFID tags vary greatly in their cost and capabilities. At the low end, there are low-cost tags that are passive, getting their power from the reader, with limited computational, storage, and communication capabilities. Major applications of such tags are as replacements for barcodes being used for Electronic Product Codes (EPC) tags and as a track-and-trace tool to prevent product counterfeiting e.g. in the pharmaceuticals industry. Further, RFID tags are used in production and/or logistics in order to individually trace the treatment for each article to be produced.

The counterfeit of medical drugs represents nowadays a concrete threat, not only to the revenues of pharmaceutical companies, but also to the safety of people who consume the drugs. In light of this threat, drug manufacturers as well as government bodies have started to take action, aiming at providing greater levels of security to the whole medical drug supply chain. In the United States, the responsible Food and Drug Administration (FDA) has recognized the need for technological solutions in addition to solutions such as tamper-evident packaging and authentication technologies such as color shifting inks, holograms, fingerprints and chemical markers embedded in a drug or its label. In this spirit, the FDA has recommended the use of RFID technology as a further tool against drug counterfeiting.

The deployment of RFID technology with mass serialization involves assigning a unique identification code ID to each pallet, case and package of drugs. This ID can be used to record data about all sales and transactions involving the product thus providing an "e-pedigree" from drug manufacturing to dispensing (drug track and trace), and to allow the drug purchaser to determine a drug's authenticity. The full data associated with the RFID tag can further be used in a number of other applications such as inventory control, drug diversion prevention and rapid drug recall. The implementation would start at the case and pallet level and progressively include all products at the case, pallet and package level, to eventually allow identification of the drug at the product level throughout the distribution system.

Track and trace technologies help secure the integrity of the drug supply chain by providing an accurate drug pedigree. Current paper based procedures are prone to errors and tampering, and are not practical to be applied at the item respectively product level. Therefore, electronic track and trace (via RFID technology) is not only the most promising approach to reliable product tracking and tracing but also has cost-reducing benefits in other areas such as inventory management. Drug authentication is crucial not only to determine a drug's authenticity upon purchase, but also in providing a drug's e-pedigree. Therefore, electronic authentication via RFID technology, together with other existing authentication technologies, can provide a more reliable basis for drug verification and track and trace.

U.S. Pat. No. 6,842,106 B2 discloses a method of securing communications in an RFID system including a reader and an RF tag having a memory configured to store information. The method comprises sending, from the reader, a message to the tag. In response to the message, the tag generates a challenge value and sends the challenge value to the reader. The reader performs a mathematical operation on the challenge value based upon a key value to generate a challenge reply and sends the challenge reply to the tag. The tag independently computes a challenge response based on the key value and a mathematical operation. The tag compares the challenge response computed by the tag with the challenge reply sent by the reader. The tag authenticates the reader if the challenge response matches the challenge reply.

GB 2 413 195 A discloses a memory tag and a reader with a password protection of the tag memory. The memory tag in the form of an RFID includes a memory storing data, an operating program and a current password. The memory tag is operable, in response to a read signal from a tag reader requesting data, to run the operating program to check the read signal for inclusion of a token dependent upon the current password. If the token is identified within the reader signal, the memory tag is operable to read the requested data and transmit it to the reader. The token may be the password itself, or a derivative of the password. The tag password may be set at the time of manufacture, or updated after each communication from the tag to the reader. Alternatively the tag receives a new password from the reader after transmitting the requested data. The current token and new passwords may be sent in encrypted form.

In the publication "Securing the pharmaceutic supply chain by Robin Koh, Edmund W. Schuster, Indy Chackrabarti, Attilio Bellman; Auto ID Center Massachusetts Institute of Technology; June 2003; http://www.mitdatacenter.org/MIT-AUTOID-WH021.pdf" there is proposed a scheme for drug authentication and drug e-pedigree, as the drug passes from organization to organization in the supply chain. The information structure for pedigrees uses a supply chain wide central repository, which increases accessibility to pedigree information to all parties in the supply chain. From each organization in the supply chain, information needed for a drug pedigree such as an Electronic Product Code (EPC) is written into this repository. The information structure for drug verification centers on files located at the manufacturer, a subset of which contains only valid EPCs, which can be extracted from the manufacturer servers and posted for secure Internet access. Other supply chain organizations can then scan the EPC from a drug and compare it to valid EPCs posted by the manufacturer. However, it is possible that a valid EPC can be adulterated as it goes out of the manufacturer's control.

In the publication "Securing the Pharmaceutical Supply Chain with RFID and Public-key infrastructure Technologies by Joseph Pearson; Texas Instruments Radio Frequency Identification Systems; RFIDPH01-June 2005; http://www.ti.com/rfid/docs/manuals/whtPapers/wp-Securing_Pharma_Supply_Chain_w_RFID_and_PKI_final.pdf" there is proposed a further scheme for drug authentication and drug pedigree, as the drug passes through the supply chain. RFID tag authentication is performed by authenticated readers, which verify the digital signature of the drug manufacturer on the unique tag identifier and the drug manufacturer identifier. This signature is made upon drug manufacturing. Track and trace functionality is achieved also with the help of the readers. They record and also write to the tag "event markers", which are essentially the date and time of supply chain events. The readers also communicate relevant event information, digitally signed by them, to the local computer system. This system, on its turn, makes the information available to an external network. This provides an inseparable link and look-up index between the tag, the supply chain event and external distributed network data, as the event marker is made available through the network at each event in the supply chain.

The schemes above prevent that genuine tags be re-written with bogus identifiers or that fake tags be programmed with bogus identifiers. However, they do not prevent that valid identifiers be read from genuine tags and copied into fake tags which can be then attached to counterfeit products. In case two or more identical identifiers are found at different points in the supply chain, the counterfeiting attack can be detected. However, the fake product may enter the supply chain before the genuine product, so the fake drug may be taken as the genuine one. Moreover, in case the genuine products are simply removed from the supply chain and replaced by the fake ones, the counterfeit attack can be successful. After the replacement, drug verification would furnish correct identifiers and track and trace would continue as usual, as if the values read from the fake tags came from genuine tags.

In the light of the above identified problems there may be a need for providing a solution in order to prevent or at least to make it more difficult to read genuine RFID devices and have their data copied into fake RFID devices, which can then be attached to fake products and replace genuine products in the supply chain in particular for pharmaceutic products.

SUMMARY OF THE INVENTION

This need may be met by the subject matter according to the independent claims. Advantageous embodiments of the present invention are described by the dependent claims.

According to a first aspect of the invention there is provided a method for controlling the data access to and from an RFID device having a data memory and a physical uncloneable function, wherein the physical uncloneable function is adapted to produce an unique but unpredictable response signal upon receiving a predefined challenging signal. The provided method comprises the steps of (a) sending a first challenging signal to the RFID device, (b) producing a first response signal based on the first challenging signal by the physical uncloneable function, (c) storing the first response signal in the data memory of the RFID device, (d) sending a request signal to the RFID device, wherein the request signal comprises a second challenging signal, (e) producing a second response signal based on the second challenging signal by the physical uncloneable function, (f) comparing the second response signal with the first response signal, and (g) providing data access to the RFID device if the second response signal is identical to the first response signal.

This aspect of the present invention is based on the idea that in order to allow for a data communication with the RFID device an appropriate reader has to authenticate itself. This reader authentication is effected by contrast to known methods for restricting the data communication with an RFID device, wherein the RFID device has to authenticate itself by sending an appropriate second challenging signal. In this context, the second challenging signal may be interpreted as a password, which enables an RFID reader to authenticate itself and to open a data communication with the data memory of the RFID device.

The first three steps of sending a first challenging signal, producing a first response signal and storing the first response signal may be understood as a special programming of the RFID device. As a consequence, the communication with the RFID device is only possible if the first and the second response signals are identical, because due to the above-described characteristic of the physical uncloneable function an unpredictable but unique response signal is generated for each challenging signal. This means that identical response signals can only be generated if also the corresponding challenging signals are identical.

In other words, the RFID device is programmed in such a way that knowledge of the value of the first challenging signal allows any entity to read and/or to extract information stored in the data memory of the RFID device. Therefore, in order to effectively restrict the data communication with the RFID device, the first challenging signal must be kept secret in a system comprising a number of different authorized entities. This means that the described method represents an effective solution for password security and management in a supply chain of goods being tagged with the described RFID devices. Thereby, a copying and counterfeiting of the RFID devices is prevented or at least greatly minimized. As a consequence, also a copying and counterfeiting of the corresponding products is effectively prevented or at least greatly minimized.

When data access to the RFID device is provided it may be possible to extract data being stored in the data memory of the RFID device. This data may be of any kind. Further, it may also be possible the write data to the data memory of the RFID device an/or to modify data being stored in the data memory of the RFID device.

The physical uncloneable function (PUF) can be realized by means of an electronic circuitry as it is described for instance in the publication "P. Tuyls and L. Batina, RFID Tags for Anti-Counterfeiting, Topics in Cryptology—CT-RSA 2006, The Cryptographers' Track at the RSA Conference 2006, February 2006", which publication is hereby incorporated by reference. In particular, reference is made to section four of this publication. Therein, a PUF is defined as a function that maps challenges to responses and that is embodied in a physical object. The PUF satisfies the following properties:

Easy to evaluate: This means that the physical object can be evaluated in a short amount of time.

Hard to characterize: This means that from a number of measurements performed in polynomial time, an attacker who no longer has the RFID device and who only has a limited amount of resources can only obtain a negligible amount of knowledge about the response to a challenge that is chosen uniformly at random.

In other words, the term "unpredictable" means that when knowing the response signal it is at least very difficult or even impossible to find out the corresponding challenging signals. This means that the values of the response signals have to be secure, but not secret.

The PUF may be for instance a silicon PUF or a so-called coating PUF. Further, the PUF may also be a device, wherein the unpredictability of the response signal is based on light scattering properties of materials.

Silicon PUFs are based on the fact that manufacturing variations in a circuit cause substantial differences in circuit delays. These variations are caused by statistic mask variations and also by temperature and pressure variations during manufacturing of the PUF. The magnitude of the delay variations caused in this way is about 5%. A challenge for the silicon PUF is a digital input signal. The delay caused by the circuit between input and output is the response of the PUF.

In a coating PUF, the chip is covered with a coating comprising e.g. aluminophosphate, which is doped with random dielectric particles. In this context random dielectric particles are several kinds of particles of random size and shape with a relative dielectric constant differing from the dielectric constant of the coating matrix. The coating PUF consists of the combination of the coating with the dielectric material. In order to challenge the coating PUF, an array of metal sensors is laid down between the substrate and a passivation layer. Sufficient randomness is obtained if the dielectric particles are smaller than the distance between the sensor parts. A challenging signal corresponds to a voltage of a certain frequency and amplitude applied to the sensor at a certain point of the sensor array. Because of the presence of the coating material with its random dielectric properties, the sensor plates behave as a capacitor with a random capacitor value. The capacitance is turned into an appropriate electronic key.

It has to be mentioned that providing the response signal by means of the PUF might involve further processing steps such as for example an error correction step and/or a privacy enhancement step. Privacy enhancement might be carried out by means of a fuzzy commitment scheme, whereby in a suitable metric for authenticating also a witness is accepted, which is close but not necessarily identical to the original encrypting witness. For further details regarding the fuzzy commitment scheme reference in made to the publication "A Fuzzy Commitment Scheme; A. Juels, M. Wattenberg in G. Tsudik, ed.; Sixth ACM Conference on Computer and Communication Security; pages 28-36; ACM Press 1999". Privacy enhancement might also be carried out by applying a fuzzy extractor, which reliably extracts a nearly uniform but random key from its input. Thereby, the extraction is error-tolerant in the sense that the key will be the same even if the input changes, as long as the input remains reasonable close to an original input. For further details regarding the mentioned fuzzy extractor reference in made to the publication "Fuzzy Extractors: How to Generate Strong Keys from Biometrics and Other Noisy Data; Yevgeniy Dodis, Leonid Reyzin and Adam Smith; Advances in Cryptology; EUROCRYPT, May 2004". Further, privacy enhancement might be carried out by applying shielding functions, which are described in the publication "New Shielding Functions to Enhance Privacy and Prevent Misuse of Biometric Templates; Jean-Paul Linnartz and Pim Tuyls; AVBPA 2003, LNCS". The disclosure of these three publications is hereby incorporated by reference.

According to an embodiment of the invention the physical uncloneable function is inseparable from the RFID device. This can be realized if the PUF is inseparably bound to a RFID chip. This may provide the advantage that any attempt to tamper with or to remove the PUF from the chip leads to the destruction of the PUF and/or the chip. In case only the PUF gets destroyed an authentication of an RFID reader for the RFID device is no longer possible. Therefore, the data being stored in the memory are not accessible any more.

According to a further embodiment of the invention the data being stored in the data memory of the RFID device are individual identification data. In particular, these data represent an electronic product code of a good or item, which can be tagged with the RFID device. This may provide the advantage that goods such as packaged medical drugs can be individually and reliably traced within a whole supply chain including various entities such as a drug manufacturer, a wholesaler, a retail seller respectively a pharmacist and a costumer respectively a patient. If any of the mentioned entities have knowledge of the appropriate challenging signal, which opens communication with the RFID device, the authenticity of the tagged goods can be checked. Therefore, counterfeited products can be easily and reliably identified, because without having knowledge of the appropriate challenging signal an illegal counterfeiting of the RFID device is not possible. This makes the supply chain and in particular a supply chain for sensitive goods such as drugs much more reliable.

The individual identification data may be stored in such a manner that they are unchangeable. This has the effect that the RFID device and also goods, which are tagged with the RFID device, can always be identified unambiguously unless the RFID device is destroyed. This may further increase the product security within a supply chain.

It has to be mentioned that it is not necessary to store the electronic product code itself in the data memory. It is rather sufficient to externally store an individual electronic product code for instance on a data memory such as a server. However, it has to be ensured that based on the individual identification data the corresponding electronic product code can be unambiguously assigned. Of course, in order to further improve the security of the supply chain the server should be secure in such a manner that only authorized entities have access.

According to a further embodiment of the invention the step of sending a first challenging signal to the RFID device is carried out by a first entity, the step of sending a request signal to the RFID device is carried out by a second entity, and the method further comprises the step of transmitting the first challenging signal from the first entity to the second entity in a secure way. This may provide the advantage that starting from the first entity only the second entity gets knowledge of the challenging signal being necessary for opening the data communication to and from the RFID device. The first entity might be for example the producer of the RFID device whereas the second entity might be a manufacturer of goods, which are supposed to be tagged with RFID devices in order to secure a supply chain for the goods.

It has to be mentioned that it is also possible that different entities throughout the supply chain can have access to the RFID device by properly authenticating themselves.

The secure transmittal of the first challenging signal to the second entity can be realized for instance by electronically signing the first challenging signal by the first entity and encrypting the signed first challenging signal with a public key of the second entity. This means that known methods for secure data transmission can be used in order to provide the second entity with knowledge about the first challenging signal, which, as described above, represents the key for opening the data communication between the RFID device and an appropriate RFID reader.

According to a further embodiment of the invention the method further comprises the step of attaching the RFID device to a product. This may provide the advantage that products or items can be individually identified within a whole supply chain starting with the manufacturer of the product and ending with a customer. Of course, the RFID device might also be used in connection with appropriate tamper resistant and/or tamper evident packaging methods in order to ensure a reliable product physical security. This might be in particular applicable for securing the supply chain of drugs, wherein a drug manufacturer produces the drugs, packages them and attaches an RFID device to each individual item's package.

According to a further embodiment of the invention the method further comprises the step of writing data into the data memory of the RFID device if the second response signal is identical to the first response signal. This may provide the advantage that every entity, which is capable of opening the data communication with the RFID device, can add further information to memory of the RFID device. This information might be for instance a time stamp when a product being equipped with the RFID device is transferred to a new entity within a predefined supply chain. Further, the information might comprise an identification code of this new entity. Therefore, the product can be easily traced within the supply chain and all upstream entities, which have been in contact with the product, can be identified.

According to a further embodiment of the invention the method further comprises the steps of (a) sending a third challenging signal to the RFID device if the second response signal is identical to the first response signal, (b) producing a third response signal based on the third challenging signal by the physical uncloneable function, and (c) storing the third response signal in the data memory of the RFID device. This may provide the advantage that any entity, which has knowledge of the first challenging signal representing a first password, is capable of changing this password. This has the effect that subsequently only entities are able to open the data communication with the RFID device, which entities have knowledge of the third challenging signal. Therefore, the third challenging signal represents an amended password for opening a data communication with the RFID device.

The described reset of the password can be carried out by any party of the supply chain in order to prevent previous parties to get unauthorized access to the RFID device. Preferably, the first password can be reset by the second or a further entity of the supply chain to a new secret value, which is the third challenging signal. This reset can be done after the second entities final reading of the RFID for instance for inventory control and just before the corresponding product leaves the second entity to go to the next party of the supply chain, which next party is for instance a wholesaler. Resetting the challenge means resetting the corresponding response stored in the RFID device from the first response to a new value, which is the third response signal.

In the corresponding protocol to reset the stored response signal, the second entity sends a clearing signal comprising the first and the third challenging signal to the RFID device. The third challenging signal represents the new password, which may be randomly generated by the second entity. Upon receiving this pair of challenging signals, the RFID device challenges its PUF with the first challenging signal and checks whether the obtained response equals to its stored value, which is the first response signal. Only in this case, the RFID device challenges its PUF with the third challenging signal in order to obtain the third response signal. Thereafter, in the data memory the first response signal will be automatically replaced with the third response signal.

It has to be mentioned that the communication channel from a RFID reader to the RFID device is usually easier to eavesdrop than the opposite communication channel from the RFID device to a RFID reader. Therefore, the easiest way for an eavesdropper to learn the data stored in the RFID device is to eavesdrop on the first password, when this first password is sent by a genuine reader to a genuine RFID device, then act as a genuine reader to enquire other RFID devices. This is in fact a common problem of password-based authentication systems. In order to reduce the risk of having a fake reader acting as genuine reader, the described reset protocol should be carried out in a safe environment, where the possibility of eavesdropping on the various challenges sent in the clearing signal is very small. Since the premises of the various entities of a supply chain are typically surveyed, it is very unlikely that an unauthorized entity can get knowledge of the required password for opening the data communication with the RFID device.

According to a further embodiment of the invention (a) the first challenging signal is sent to a plurality of RFID devices each having a data memory and a physically uncloneable function, (b) for each of the plurality of RFID devices an individual first response signal is produced based on the first challenging signal by the respective physically uncloneable function, and (c) for each of the plurality of RFID devices the individual first response signal is stored in the respective data memory. This may provide the advantage that simultaneously a plurality of RFID devices can be programmed in such a manner that only entities having knowledge of the first challenging signal representing a common password can open a data communication with the RFID devices.

It has to be mentioned that the first challenging signal is a common first challenging signal. Therefore, information regarding a whole batch of products, which products are equipped with a corresponding RFID device, can be effectively secured against counterfeiting.

According to a further embodiment of the invention (a) the request signal comprising the second challenging signal is sent to at least some of the RFID devices, (b) for each of the at least some of the RFID devices an individual second response signal is produced based on the second challenging signal by the respective physical uncloneable function, (c) for each of the at least some of the RFID devices the individual second response signal is compared with the respective individual first response signal, and (d) for each of the at least some of the RFID devices data access is provided if the respective second response signal is identical to the respective first response signal.

This may provide the advantage that when applying an appropriate common second challenging signal representing a common password for a batch of different RFID devices a data communication to and from these RFID devices can be simultaneously opened. In case the RFID devices are attached to different items of a batch of products information regarding every individual RFID device respectively every individual product can be extracted and/or amended. Thereby, a secure supply chain may be effectively established even for a big number of products.

According to a further aspect of the invention there is provided an RFID device comprising a processing element, a data memory being coupled to the processing element, and a physical uncloneable function being coupled to the processing element. (a) The physical uncloneable function is adapted to produce an unique but unpredictable first response signal based on a first challenging signal, (b) the RFID device is adapted to store the first response signal in the data memory, (c) the physical uncloneable function is adapted to produce an unique but unpredictable second response signal based on a second challenging signal, (d) the processing element is adapted to compare the second response signal with the first response signal, and (e) the RFID device is adapted to output data being stored in the data memory of the RFID device if the second response signal is identical to the first response signal.

This aspect of the present invention is based on the idea that an unauthorized RFID reader is prevented from reading of the described RFID device, which is a genuine RFID device. In other words, an RFID reader must authenticate to the tag before it can read data stored in the data memory of the RFID device. By contrast to known methods for restricting the data communication with an RFID device, the described RFID device does not authenticate itself to a RFID reader. According to this aspect of the invention data access is only possible if the described RFID reader has authenticated himself to the RFID device. In this context, the second challenging signal may be interpreted as a password, which enables an RFID reader to open a data communication with the data memory of the RFID device.

The RFID device is programmed in such a way that knowledge of the value of the first challenging signal allows any entity to read and/or to extract information stored in the data memory of the RFID device. Therefore, in order to effectively restrict the data communication with the RFID device, the first challenging signal must be kept secret in a system comprising a number of different authorized entities. This means that the described RFID device allows for effectively maintain password security and password management in a supply chain of goods being tagged with the described RFID devices. Thereby, a copying and counterfeiting of the RFID devices is prevented or at least greatly minimized.

Further details regarding the physical uncloneable function (PUF) have already been given above. Therefore, with regard to the design of the PUF reference is made to the corresponding paragraphs given above.

The described RFID device may provide the advantage that it represents a tamper-resistant component such that the data on the data memory cannot easily be deleted and/or changed in a way other than required. Thereby, the only possible way for an RFID reader to open a data communication with the RFID device is to send the correct challenging signal representing a secret password.

The RFID device may further provide the advantage that the above-described method for controlling the data access to and from an RFID device can be carried out with comparatively simple passive RFID devices having a limited functionality. Therefore, using the described RFID devices provides an effective solution for product anti-counterfeiting, whereby costs and investments on new infrastructures can be kept low.

According to an embodiment of the invention the physical uncloneable function is inseparable from the RFID device. As has already been mentioned above in connection with the above-described method for controlling the data access to and from the RFID device, this can be realized if the PUF is inseparably bound to an RFID chip. This may provide the advantage that any attempt to tamper with or to remove the PUF from the chip leads to the destruction of the PUF and/or of the chip respectively of the whole RFID device.

According to a further aspect of the invention there is provided an RFID reading device comprising a data processor. The RFID reading device is adapted to communicate with an RFID device as described above by sending a second challenging signal, which is identical to the first challenging signal.

This aspect of the present invention is based on the idea that before opening a communication channel between the described RFID reading device and the RFID device, the RFID reading device must authenticate to the RFID device. This means that only if the RFID reading device has knowledge of the appropriate challenging signal, the RFID reading device may have access to the data memory of the RFID device. Therefore, the second challenging signal may be interpreted as a password, which, if it is identical to the first challenging signal, enables an RFID reader to open a data communication with the RFID device.

According to a further aspect of the invention there is provided an RFID system comprising (a) an RFID device as described above and (b) a first RFID reading device corresponding to the RFID reading device as also described above.

This aspect of the invention is based on the idea that the above-described RFID device and the above-described RFID reading device can be combined in such a manner that an effective password security system may be established for a supply chain of products, whereby the supply chain may comprise two or even more entities. Thereby, the products can be equipped with the described RFID device such that at any entity of the supply chain can identify the tagged products. However, this identification may only be carried out by authorized parties or entities. This may provide for a significant improvement of product security because counterfeited products can be easily identified.

The above-described properties of the physically uncloneable function further make sure that a product counterfeiter cannot copy a genuine RFID device and attach it to a counterfeited product. Such a copying possibility of RFID tags would make it possible that the counterfeiter illegally introduces a counterfeited product into the supply chain before the genuine product is further supplied. In this case, by reading the copied RFID device, downstream entities of the supply chain would consider the counterfeited product as to be the genuine product. However, because of the PUF, which cannot be copied, such an illegal launching of counterfeited products is definitely not possible any more.

According to an embodiment of the invention the RFID system further comprises a second RFID reading device, which also corresponds to the RFID reading device as described above. Thereby, the first RFID reading device is assigned to a first entity of a product supply chain and the second RFID reading device is assigned to a second entity of the product supply chain.

This may provide the advantage that by transferring the appropriate challenging signal from the first entity to the second entity an effective and reliable password security and password management system can be established. Thereby, the first entity might be for example a producer of the RFID device, who initially programs the RFID device in an appropriate manner. The second entity might be for example a product manufacturer, who attaches the above-described RFID device to a manufactured product in order to prevent from introducing counterfeited products into the supply chain. In this respect an effective prevention can be realized if all involved parties of the product chain (a) have access to an appropriate RFID reading device and (b) have knowledge of the current challenging signal, which causes the PUF of the RFID device to produce the same response signal, which is actually stored on the data memory.

Of course, the product supply chain may also include further parties such as a wholesaler, a retail seller and a customer. By subsequently transferring the appropriate challenging signal to these parties, the product integrity can be easily checked and counterfeited products can be immediately identified and removed from the product supply chain.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
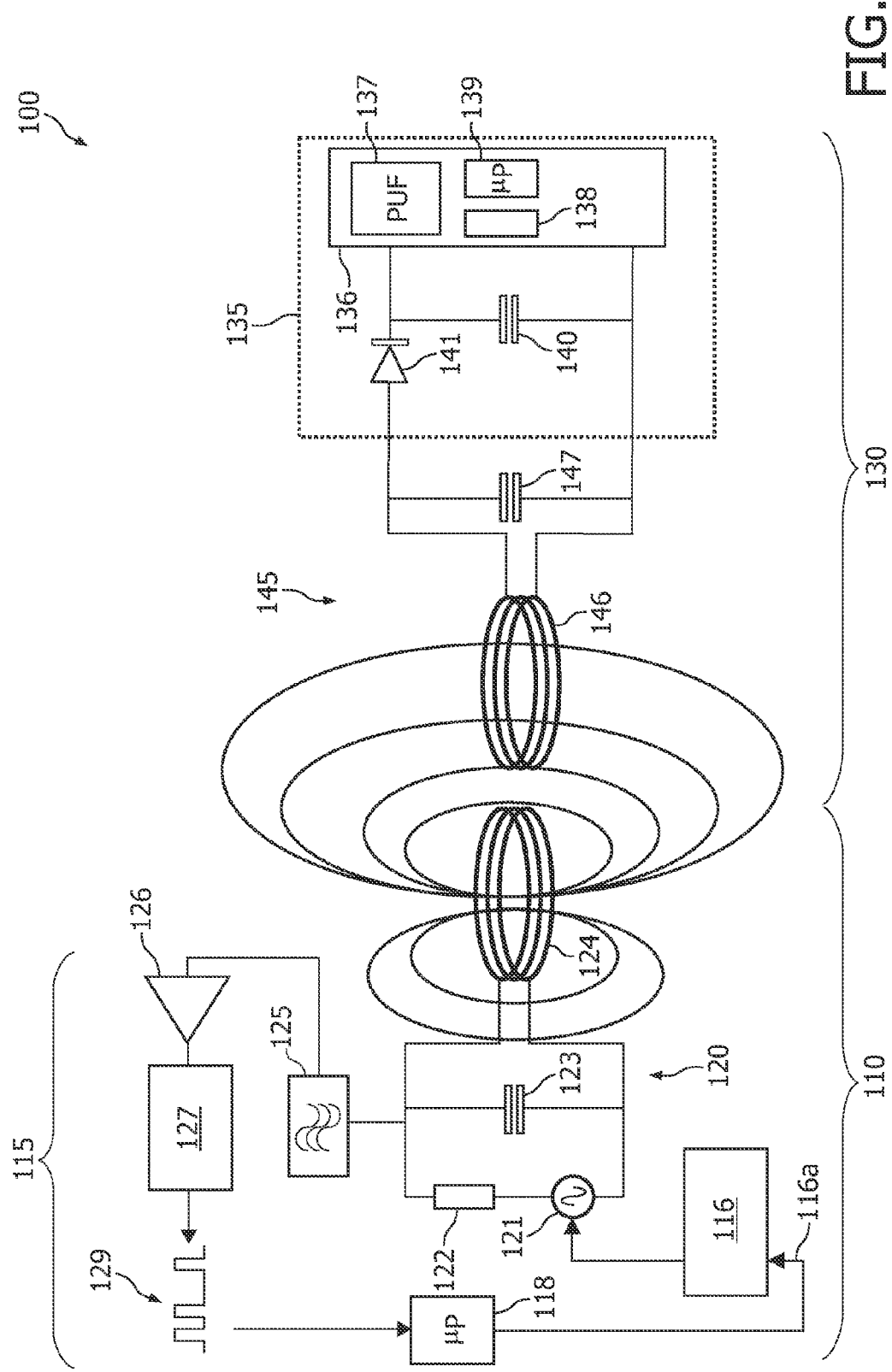
FIG. 1 shows an RFID system comprising an RFID reading device and an RFID device having a physically uncloneable function.

The illustration in the drawing is schematically. It is noted that in different figures, similar or identical elements are provided with the same reference signs or with reference signs, which are different from the corresponding reference signs only within the first digit.

FIG. 1 shows an RFID system 100 comprising an RFID reading device 110 and an RFID device 130 according to an embodiment of the invention. The RFID device might also be denoted an RFID tag 130.

The RFID reading device 110 comprises an electronic circuit 115 and an antenna 124. The antenna 124 is used both for transmitting RF radiation signals to the RFID device 130 and for receiving RF radiation signals backscattered from the RFID device 130.

The electronic circuit 115 comprises a so-called Amplitude Shift Keying (ASK) modulator 116. The operation of the ASK modulator 116 can be triggered by a drive signal 116a. The drive signal 116a is directly or indirectly generated by a data processor 118 of the RFID reading device 110. The ASK modulator 116 is coupled to an oscillating circuit 120 via a signal injecting unit 121 being a part of the oscillating circuit 120. The oscillating circuit 120 further comprises a resistor 122, a capacitor 123 and the antenna 124.

The communication between the RFID reading device 110 and the RFID device 130 starts with transmitting a challenging signal from the RFID reading device 110 by means of the antenna 124 to the RFID device 130. As will be described below in more detail, the challenging signal represents a password, which when being the correct one, opens a data communication between the RFID reading device 110 and the RFID device 130. In case of an open data connection between the RFID reading device 110 and the RFID device 130, the challenging signal triggers the RFID device 130 to transmit a coded signal back to the RFID reading device 110. This coded signal is picked up by the antenna 124.

In order to extract this coded signal from the antenna 124 respectively from the oscillating circuit 120 a band pass filter 125 is used. The band pass filter 125 is connected to a demodulator 127 via an amplifier 126. The demodulator 127 provides digital output data 129 representing the information, which has been transmitted from the RFID device 130 to the RFID reading device 110.

The RFID device 130 comprises an RFID chip 135 and a communication interface 145. The RFID chip 135, which is typically protected by an appropriate housing, comprises an RFID circuitry 136. The RFID circuitry 136 comprises a physically uncloneable function (PUF), a data memory 138 and a processing element 139. The functionality and possible designs of the PUF have already been described above. Therefore, reference is made to the summary of invention described above.

When the RFID device 130 is triggered by the RFID reading device 110, the RFID circuitry 136 provides a binary modulation code. This binary modulation code drives an oscillating circuit comprising an antenna element 146 and a capacitor 147. A diode 141 and a capacitor 140 are used for providing a suitable coupling between the RFID circuitry 136 and the oscillating circuit.

Figure 2A:
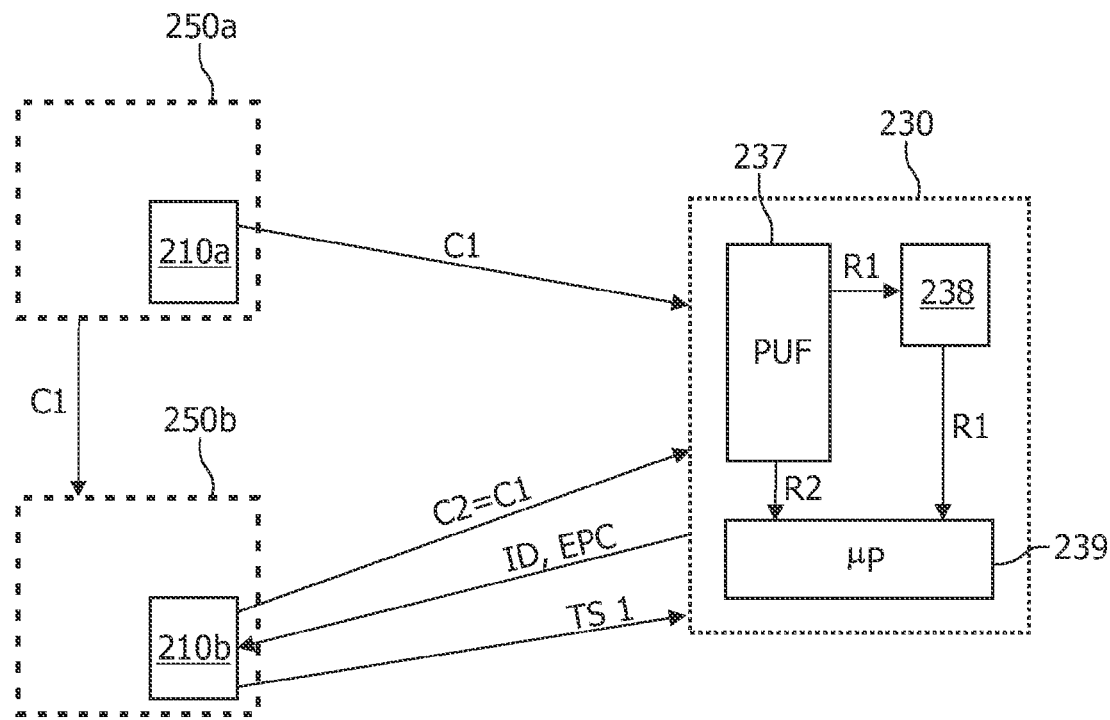
FIG. 2a shows a schematic diagram illustrating the programming of an RFID device by a first RFID reading device and the opening of a data connection between a second RFID reading device and the RFID device.

FIG. 2a shows a schematic diagram illustrating the programming of the RFID device 230 by a first RFID reading device 210a. The diagram further illustrates the opening of a data connection between a second RFID reading device 210b and the RFID device 230. The first RFID reading device 210a is assigned to a first entity 250a of a supply chain. The second RFID reading device 210b is assigned to a second entity 250b of a supply chain.

The programming of the RFID device 230 includes sending a first challenging signal C1 to the RFID device 230. The RFID device 230 challenges its physically uncloneable function (PUF) 237 with this first challenging signal C1. The PUF 237 generates a first response signal R1, which is unique but unpredictable. "Unique" means that for different RFID devices 230 different response signals are produced. "Unpredictable" means that when knowing the response signal R1 it is at least very difficult or even impossible to find out the corresponding challenging signal C1. Therefore, the exact value of the response signal has to be secure, but not secret.

The response signal R1 is stored in the data memory 238 of the RFID device 230.

In order to authenticate a second RFID reading device 210b being assigned to the second entity 250b the first challenging signal C1 is transferred in a secure manner from the first RFID reading device 210a to the second RFID reading device 210b. For opening a data connection between the second RFID reading device 210b and the RFID device 230 the second RFID reading device 210b sends a second challenging signal C2 to the RFID device 230 and the RFID device 230 again challenges its PUF 237 with this second challenging signal C2. The PUF 237 will generate a second response signal R2. A processing element 239 of the RFID device 230 compares the two response signals R2 and R1 with each other.

If this comparison shows that the two response signals R2 and R1 are not identical, the second RFID reading device 210b will not be allowed to further communicate with the RFID device 230. As a consequence, a product the RFID tag 230 might be attached to might be a counterfeited product.

If the two response signals R2 and R1 are identical, the data connection between a second RFID reading device 210b and the RFID device 230 will be opened. An identification code ID of the RFID device 230 can be extracted from the data memory 238. This identification code ID might also be an electronic product code EPC. Further, a first Time Stamp TS1 indicating for instance the time of extracting the identification code ID might be written into the data memory 238.

Figure 2B:
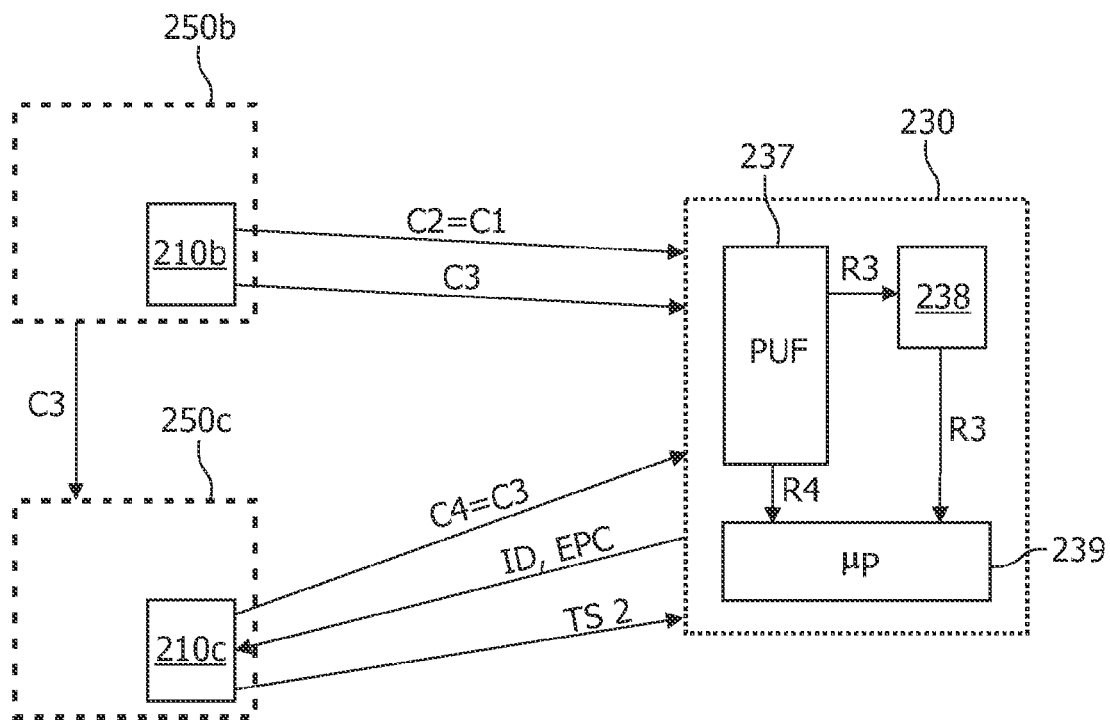
FIG. 2b shows a schematic diagram illustrating a password resetting procedure by means of the second RFID reading device and the opening of a data connection between a third RFID reading device and the RFID device.

FIG. 2b shows a schematic diagram illustrating a password resetting procedure by means of the second RFID reading device 210b and the opening of a data connection between a third RFID reading device 210c and the RFID device 230. The third RFID reading device 210c is assigned to a third entity 250c of a supply chain.

The password resetting procedure comprises sending a clearing signal including both the appropriate second challenging signal C2 and a third challenging signal C3. The second challenging signal C2 is identical to the first challenging signal C1 such that further communication between the second RFID reading device 210b and the RFID device is allowed. In response to the third challenging signal C3 the PUF 237 generates a third response signal R3, which is stored in the data memory 238 and replaces the previously stored first response signal R1.

In order to authenticate a third RFID reading device 210c being assigned to a third entity 250c the third challenging signal C3 is transferred in a secure manner from the second RFID reading device 210b to the third RFID reading device 210c. For opening a data connection between the third RFID reading device 210c and the RFID device 230, the third RFID reading device 210c sends a fourth challenging signal C4 to the RFID device 230. The RFID device 230 challenges its PUF 237 with this fourth challenging signal C4 and the PUF 237 will generate a fourth response signal R4. The processing element 239 of the RFID device 230 compares the two response signals R4 and R3 with each other.

If this comparison shows that the two response signals R4 and R3 are not identical, the third RFID reading device 210c will not be allowed to further communicate with the RFID device 230. As a consequence, a product the RFID tag 230 might be attached to might be a counterfeited product.

If the two response signals R4 and R3 are identical, the data connection between the third RFID reading device 210c and the RFID device 230 will be opened. An identification code ID respectively an Electronic Product Code EPC of the RFID device 230 can be extracted from the data memory 238. Further, a second Time Stamp TS2 indicating for instance the time of extracting the identification code ID by the third RFID reading device 210c might be written into the data memory 238.

Figure 3:
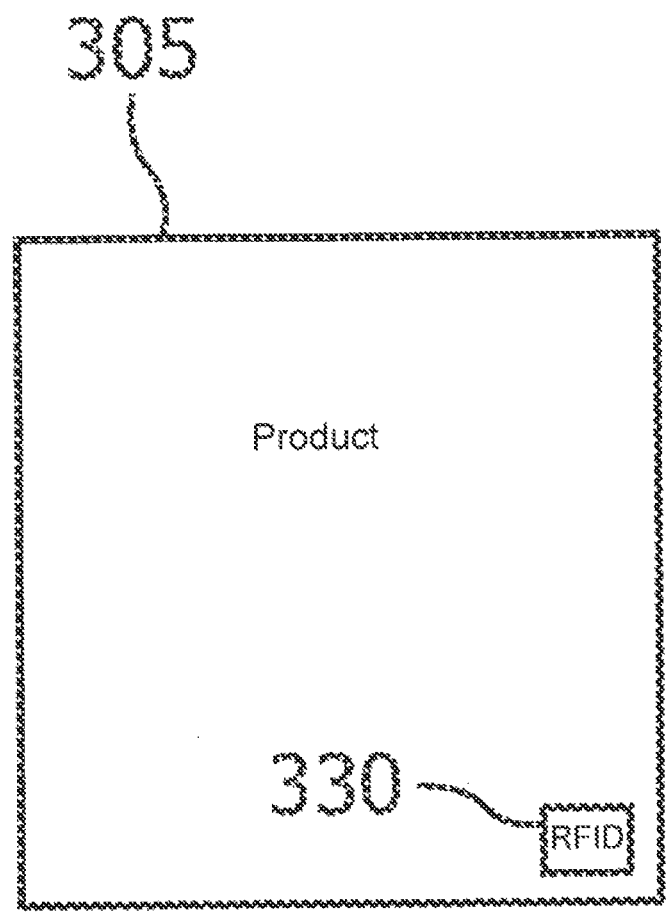
FIG. 3 shows a product being equipped with an RFID device in order to allow for reliably characterizing the product as a genuine product or as a counterfeited product.

FIG. 3 shows a product 305 being equipped with an RFID device 330. If the RFID device 330 corresponds to an RFID device described above such that the product 305 can be reliably characterized as a genuine product or as a counterfeited product. It has to be mentioned that depending on the type of the product 305 the RFID device 330 can also be firmly attached to a package of the product 305. Such a package tagging is for instance suitable when the product 305 is a drug or a batch of drugs.

Figure 4:
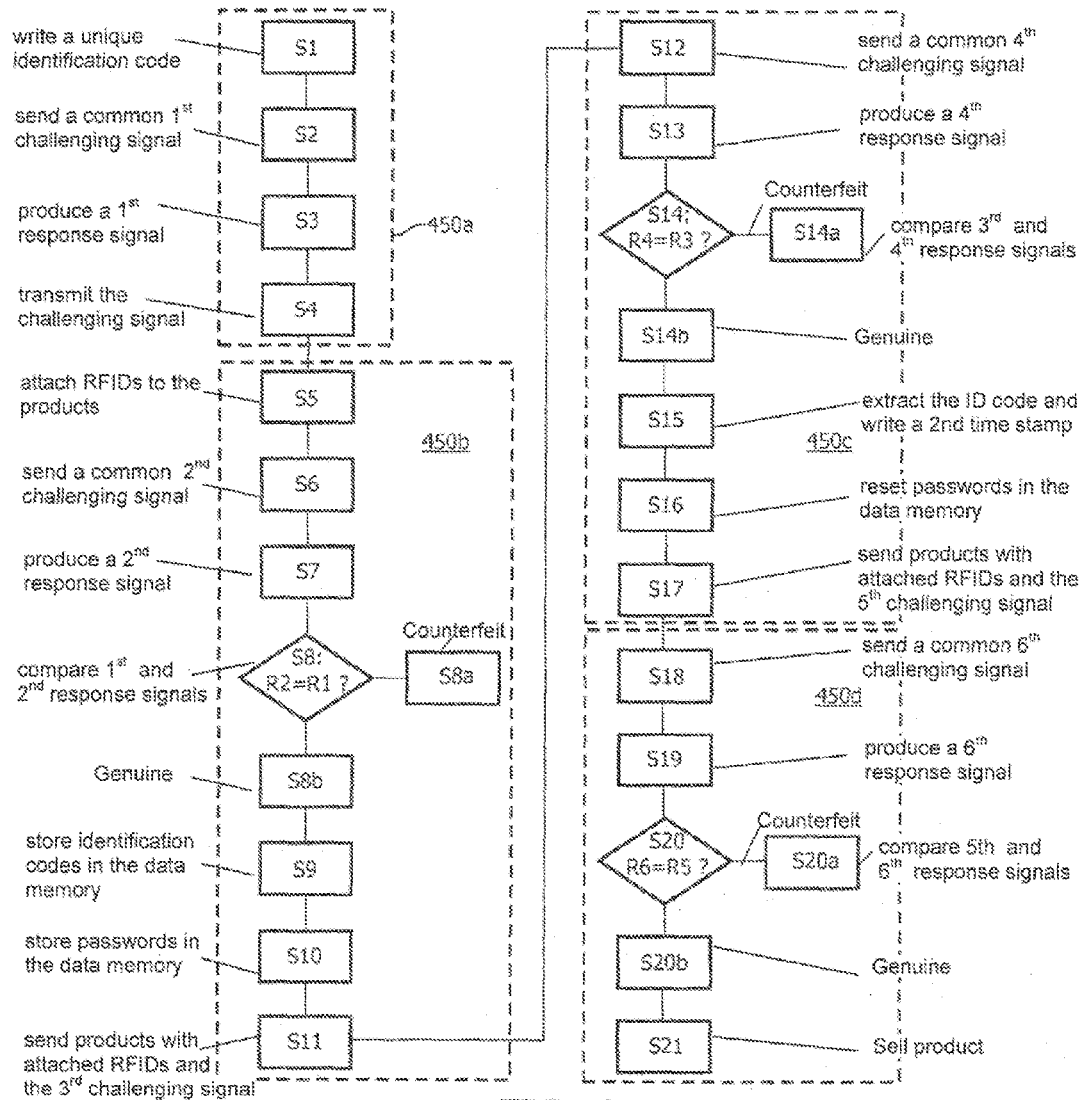
FIG. 4 shows a flowchart illustrating a method for improving the product security of a product supply chain starting from a product manufacturer and ending with a retail seller.

FIG. 4 is a flowchart illustrating a method for improving the product security of a product supply chain starting from a product manufacturer 450b and ending with a retail seller 450d. According to the embodiment described above the product manufacturer is a drug manufacturer 450b and the retail seller is a pharmaceutics retail seller respectively a pharmacist 450d. The drugs are tagged with RFID devices, which correspond to the RFID device 330, 230, 130 as described above.

The method starts with four steps S1, S2, S3 and S4, which are carried out by a manufacturer 450a of RFID devices. Thereby, the RFID devices are initially programmed.

In step S1, the manufacturer 450a writes a unique identification code ID to each RFID device Ti. This identification code ID may later be used for assigning an electronic product code to each of the RFID devices Ti, when these RFID devices Ti have been firmly attached to products.

In step S2 the RFID device manufacturer 450a sends a common first challenging signal C1 to a whole batch of RFID devices Ti. It is emphasized that the first challenging signal C1 is the same for each of the RFID devices Ti.

In step S3 (a) each RFID device Ti challenges its PUF with the common first challenging signal C1, (b) the PUF of each RFID device Ti produces an individual first response signal R1 and (c) this individual first response signal R1, which is different for each RFID device Ti, is written into the corresponding data memory of each RFID device Ti.

In step S4 the RFID device manufacturer 450a sends a batch of programmed RFID devices Ti and the corresponding common first challenging signal C1 to the drug manufacturer 450b. Thereby, the transmittal of the challenging signal C1 can be carried out electronically. However, it has to be ensured that this transmittal is carried out in a secret way e.g. by employing well-known encrypting procedures.

The method continues with further steps S5, S6, S7, S8, S8a/S8b, S9, S10 and S11, which are carried out by the drug manufacturer 450b. Thereby, the RFID devices are attached to drug packages and further information is written to the data memories of the RFID devices.

In step S5 the RFID devices Ti are attached to the products respectively the drugs Pi. Thereby, correlation data between the identification code ID of each RFID device and the corresponding drug being packaged in an appropriate way are obtained and stored on a server. It has to be mentioned that the step S5, i.e. the attachment procedure of the RFID tags, can alternatively also be carried out after performing the following steps S6, S7, S8, S8a/S8b, S9 and/or S10.

In step S6 the drug manufactures sends a common second challenging signal C2 to each RFID device Ti.

In step S7 each RFID device Ti (a) challenges its PUF with the common second challenging signal C2 and the PUF of each RFID device Ti (b) produces an individual second response signal R2.

In step S8 this individual second response signal R2, which is different for each RFID device Ti, is compared with the first response signal R1 being actually stored in the data memory of each RFID device Ti.

If the second response signal R2 is not equal to the first response signal R1, the method continues with step S8a indicating that a counterfeited RFID device Ti has been identified. No further data access is possible between a RFID reading device of the drug manufacturer 450a and the RFID device Ti.

If the second response signal R2 is equal to the first response signal R1, the method continues with step S8b indicating that the RFID device Ti is a genuine tag. The data connection between each RFID device Ti and the RFID reading device of the drug manufacturer 450a is opened.

In step S9 the identification codes ID being stored in the data memory of each RFID device Ti is extracted and a time stamp TS1 is written to each RFID device Ti.

In step S10 the password corresponding to the individual response signal being stored in each data memory and being associated with a common challenging signal is reset in order to no longer allow the RFID device manufacturer 450a to communicate with the RFID devices Ti. In the resetting procedure a clearing signal is transmitted to the RFID devices Ti. The clearing signal comprises the first challenging signal C1 and a third challenging signal C3. After accepting the first challenging signal C1 and opening the data connection the PUF of each RFID device Ti generates a third response signal R3 based on the third challenging signal C3. The third response signal R3 is written into the data memory of each RFID device. Thereby, the third response signal R3 replaces the previously stored first response signal R1.

In step S11 the drug manufacturer 450b sends a batch of products/drugs Pi each with an attached RFID device Ti and the corresponding third challenging signal C3 to a pharmaceutics wholesaler 450c. Again, the transmittal of the third challenging signal C3 should be carried out in a secure way.

The method continues with further steps S12, S13, S14, S14a/S14b, S15, S16 and S17, which are carried out by the pharmaceutics wholesaler 450c.

In step S12 the pharmaceutics wholesaler 450c sends a common fourth challenging signal C4 to each RFID device Ti being attached to a certain drug respectively drug package.

In step S13 (a) each RFID device Ti challenges its PUF with the common fourth challenging signal C4 and (b) the PUF of each RFID device Ti produces an individual fourth response signal R4.

In step S14 this individual fourth response signal R4, which is different for each RFID device Ti, is compared with the third response signal R3 being actually stored in the data memory of each RFID device Ti.

If the fourth response signal R4 is not equal to the third response signal R3, the method continues with step S14a indicating that a counterfeited RFID device Ti respectively a counterfeited product/drug has been identified. No further data access is possible between a RFID reading device of the wholesaler 450c and the RFID device Ti. The counterfeited products Pi are removed from the supply chain.

If the fourth response signal R4 is equal to the third response signal R3, the method continues with step S14b indicating that the RFID device Ti respectively the product/drug is genuine. The data connection between each RFID device Ti and the RFID reading device of the wholesaler 450c is opened.

In step S15 the wholesaler 450c extracts the identification code ID from each RFID device Ti and writes a second time stamp TS21 to each RFID device Ti.

In step S16 the password, which corresponds to the individual response signal being presently stored in each data memory and which is associated with a common challenging signal, is reset in order to no longer allow the drug manufacturer 450b to communicate with the RFID devices Ti. In the resetting procedure a further clearing signal is transmitted to the RFID devices Ti. The further clearing signal comprises the third challenging signal C3 and a fifth challenging signal C5. After accepting the third challenging signal C3 and opening the data connection the PUF of each RFID device Ti generates a fifth response signal R5 based on the fifth challenging signal C5. The fifth response signal R5 is written into the data memory of each RFID device. Thereby, the fifth response signal R5 replaces the previously stored third response signal R3.

In step S17 the wholesaler 450c sends a batch of products Pi each attached with an RFID device Ti and the corresponding fifth challenging signal C5 to a retail seller 450d. Again the fifth challenging signal C5 is transmitted in a secure manner.

The method continues with further steps S18, S19, S20, S20a/S20b and S21, which are carried out by the pharmaceutics retail seller respectively the pharmacist 450d.

In step S18 the pharmacist 450d sends a common sixth challenging signal C6 to each RFID device Ti being attached to a certain drug respectively drug package.

In step S19 each RFID device Ti (a) challenges its PUF with the common sixth challenging signal C6 and the PUF of each RFID device (b) Ti produces an individual sixth response signal R6.

In step S20 this individual sixth response signal R6 is compared with the fifth response signal R5 being presently stored in the data memory of each RFID device Ti.

If the sixth response signal R6 is not equal to the fifth response signal R5, the method continues with step S20a indicating that a counterfeited RFID device Ti respectively a counterfeited product/drug has been identified. No further data access is possible and the counterfeited products Pi are removed from the supply chain.

If the sixth response signal R6 is equal to the fifth response signal R5, the method continues with step S20b indicating that the RFID device Ti respectively the product/drug is genuine. The data connection between each RFID device Ti and the RFID reading device of the pharmacist 450d is opened.

In step S21 the pharmacist 450d sells one of the genuine products/drugs Pi to a customer respectively a patient. In order to maintain the privacy of the patient the pharmacist 450d may kill the RFID device Ti. However, the RFID device Ti may also be kept running such that the patient is able to further use the information being stored in the data memory of the RFID device Ti for instance in order to maintain an automatic control regarding the maximal self-life of different drugs.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

It is described a method for controlling data access to and from an RFID device 230. Thereby, an RFID reading device 210b authenticates himself to the RFID device 230 before the RFID device 230 communicates with the RFID reading device 210b. The RFID device 230 is equipped with a physically uncloneable function 237, which is adapted to produce a unique but unpredictable response signal R1, R2 upon receiving a predefined challenging signal C1, C2. During an enrolment of the RFID device a first response signal R1 being uniquely associated with a first challenging signal C1 is stored in a memory 238 of the RFID device 230. The first challenging signal C1 represents a password for opening further data communication with the RFID device 230. When a RFID reading device queries the RFID device 230 with a second challenging signal C2, the RFID device 230 compares the corresponding response signal R2 with the response R1 being stored during enrollment and only if there is a match, responds with its identifier ID.

LIST OF REFERENCE SIGNS

100 RFID system
110 RFID reading device
115 electronic circuit
116 amplitude shift keying modulator/ASK modulator
116a drive signal
118 data processor
120 oscillating circuit
121 signal injecting unit
122 resistor
123 capacitor
124 antenna
125 band pass filter
126 amplifier
127 demodulator
129 output data 130 RFID device/RFID tag
135 RFID chip
136 RFID circuitry
137 physically uncloneable function (PUF)
138 data memory
139 processing element
140 capacitor
141 diode
145 communication interface
146 antenna element
147 capacitor
210a first RFID reading device
210b second RFID reading device
210c third RFID reading device
230 RFID device/RFID tag
237 physically uncloneable function (PUF)
238 data memory
239 processing element
250a first entity/first party
250b first entity/first party
250c first entity/first party
C1 first challenging signal
R1 first response signal
C2 second challenging signal
R2 second response signal
C3 third challenging signal
R3 third response signal
C4 fourth challenging signal
R4 fourth response signal
ID Identification code
EPC Electronic Product Code
TS1 first Time Stamp
TS2 second Time Stamp
305 product/drug package
330 RFID device/RFID tag
450a first entity/RFID device manufacturer
450b second entity/drug manufacturer
450c third entity/pharmaceutics wholesaler
450d third entity/pharmaceutics retail seller/pharmacist
S1 writing a unique identification code ID to each RFID device Ti
S2 sending a common first challenging signal C1 to each RFID device Ti
S3 each RFID device Ti: challenging PUF with C1, producing an individual first response signal R1, writing R1 into data memory
S4 sending a batch of programmed RFID devices Ti and corresponding C1 to drug manufacturer
S5 attaching RFID device Ti to product Pi
S6 sending a common second challenging signal C2 to each attached RFID device Ti
S7 each RFID device Ti: challenging PUF with C2, producing an individual second response signal R2
S8 each RFID device Ti: comparing R2 with R1
S8a if R2 not equal R1: identification of counterfeited RFID devices Ti, no further data access!
S8b if R1 equal R1: indicating RFID device Ti as genuine tag, opening data connection between each RFID device Ti and RFID reading device
S9 extracting ID from each RFID device Ti, writing time stamp TS1 to each RFID device Ti
S10 resetting password by sending clearing signal comprising the first challenging signal C1 and a third challenging signal C3, producing an individual third response signal R3, writing R3 into data memory
S11 sending a batch of products Pi with attached RFID device Ti and corresponding C3 to wholesaler
S12 sending a common fourth challenging signal C4 to each attached RFID device Ti
S13 each RFID device Ti: challenging PUF with C4, producing an individual fourth response R4
S14 each RFID device Ti: comparing R4 with R3
S14a if R4 not equal R3: identification of counterfeited products Pi, removing products Pi from supply chain
S14b if R4 equal R3: indicating products Pi as genuine products, opening data connection between each RFID device Ti and RFID reading device
S15 extracting ID from each RFID device Ti, writing Time Stamp TS 2 to each RFID device Ti
S16 resetting password by sending clearing signal comprising third challenging signal C3 and fifth challenging signal C5, producing an individual fifths response signal R5, writing R5 into data memory
S17 sending a batch of products Pi with attached RFID device Ti and corresponding C5 to retail seller
S18 sending a common sixth challenging signal C6 to each attached RFID device Ti
S19 each RFID device Ti: challenging PUF with C6, producing an individual sixth response R6
S20 each RFID device Ti: comparing R6 with R5
S20a if R6 not equal R5: identification of counterfeited products Pi, removing products Pi from supply chain
S20b if R6 equal R5: indicating products Pi as genuine products
S21 selling product Ti to customer, killing RFID device Ti

The invention claimed is:

1. A method for controlling the access to and from an RFID device having a memory and a processor for executing a physical uncloneable function (PUF) to produce a unique unpredictable response signal, the method comprising acts of:
on the RFID device:
receiving a first challenge RF signal;
producing a first response based on the first challenge RF signal using the PUF;
receiving a request RF signal that comprises a second challenge;
producing a second response based on the second challenge using the PUF;
comparing, by the RFID device, the second response to the first response; and
providing data access to the RFID device when the second response is identical to the first response.

2. The method according to claim 1, wherein the PUF is inseparable from the RFID device.

3. The method according to claim 1, wherein data stored in the memory of the RFID device is individual identification data representing an electronic product code of a good or item tagged by the RFID device.

4. The method according to claim 1, wherein the first challenge RF signal is received from a first entity and the request RF signal is received from a second entity, and further comprising an act of transmitting the first challenge RF signal from the first entity to the second entity in a secure way.

5. The method according to claim 1, further comprising an act of attaching the RFID device to a product.

6. The method according to claim 1, further comprising an act of writing data into the memory when the second response is identical to the first response.

7. The method according to claim 1, further comprising acts of:
receiving a third challenge RF signal when the second response is identical to the first response; and producing a third response based on the third challenge RF signal using the PUF.

8. The method according to claim 1, wherein the RFID device comprises a plurality of RFID devices each having a data memory and a physical uncloneable function and the acts are performed on each of the plurality of RFID devices.

9. The method according to claim 8, wherein the request RF signal comprising the second challenge is received on at least some of the RFID devices, and further comprising an act of:

for each of the at least some of the RFID devices
producing an individual second response based on the second challenge using the respective PUF; and
providing access when the respective second response is identical to the respective first response.

10. An RFID system comprising:
an RFID device including:
a processing element,
a memory coupled to the processing element, and
a physical uncloneable function (PUF) on the processing element, to produce a unique but unpredictable first response based on a first challenge RF signal, and a unique but unpredictable second response based on a second challenge, at least the first response is stored in the memory,
wherein the RFID device compares the second response to the first response, and
wherein access to the RFID device is provided when the second response is identical to the first response.

11. The RFID system according to claim 10, wherein the PUF is inseparable from the respective RFID device.

12. The RFID system according to claim 10, further including an RFID reading device comprising:
a data processor to communicate with the RFID device by sending a second challenge processed by the PUF forming an identical response to the first challenge RF signal processed by the PUF.

13. An RFID system comprising:
an RFID device including:
a processing element;
a data memory coupled to the processing element; and
a physical uncloneable function (PUF) on the processing element to produce a unique but unpredictable first response based on a first challenge RF signal and a unique but unpredictable second response based on a second challenge, at least the first response is stored in the memory, the RFID device is adapted to compare the second response to the first response, and the processing element is adapted to provide data access to the RFID device when the second response is identical to the first response; and
an RFID reading device including a data processor for communicating with the RFID device by sending a second challenge that when processed by the PUF forms an identical response to the first challenge RF signal processed by the PUF.

14. An RFID system comprising:
a plurality of RFID reading devices, each including a data processor communicating with a plurality of RFID devices, at least one of the plurality of RFID reading devices is assigned to at least one entity of a product supply chain and at least one other of the plurality of RFID reading devices is assigned to at least one other entity of the product supply chain;
each of the plurality of RFID devices comprising:
a processing element;
a memory coupled to the processing element; and
a physical uncloneable function (PUF) on the processing element to produce a unique but unpredictable first response based on a first challenge RF signal and a unique but unpredictable second response based on a second challenge,
wherein the RFID device compares the second response to the first response, and
wherein access to the RFID device is provided when the second response is identical to the first response.

* * * * *